No. 631,915. Patented Aug. 29, 1899.
C. W. WHITE.
BALING PRESS.
(Application filed Apr. 24, 1895.)
(No Model.) 5 Sheets—Sheet 1.
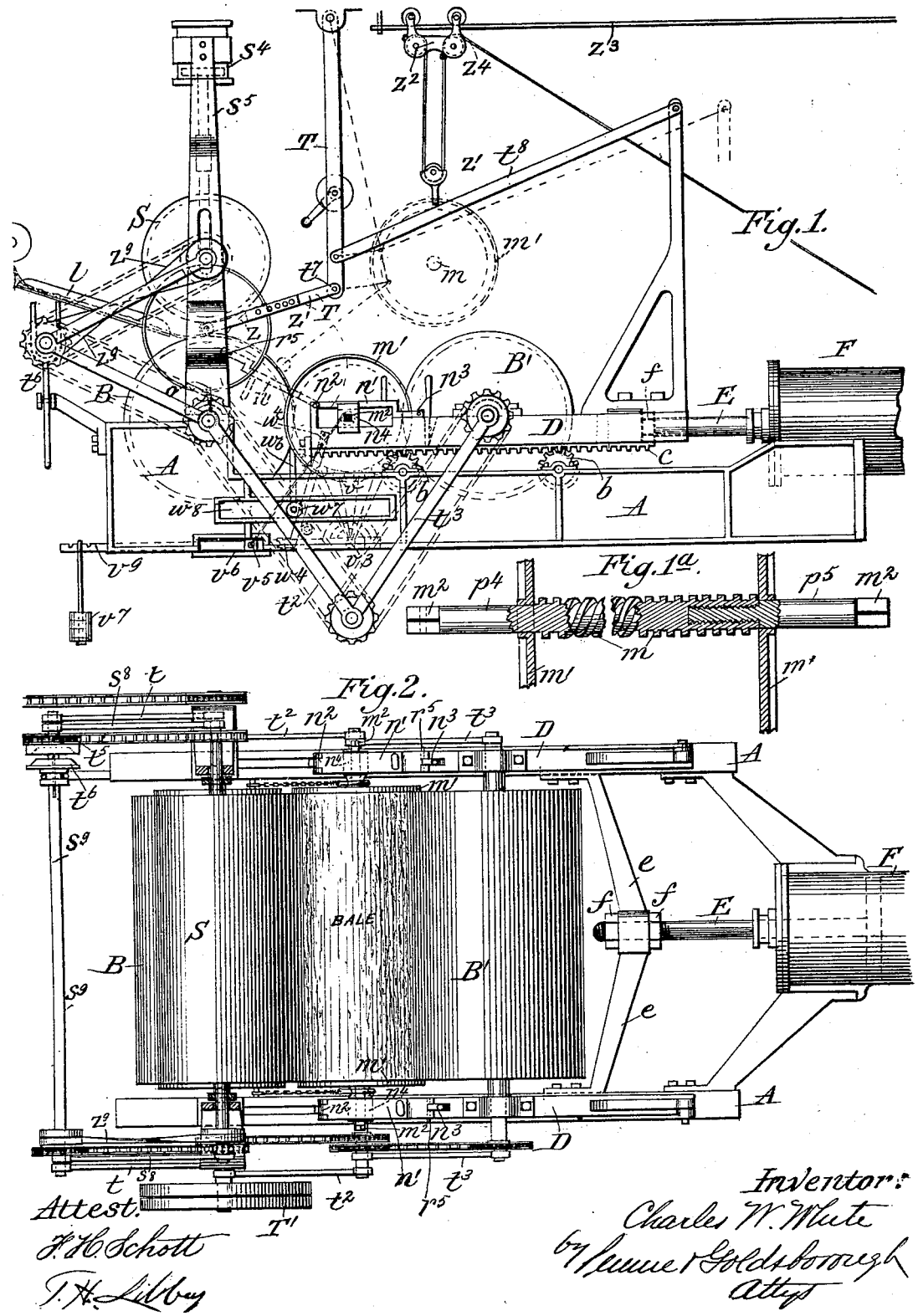
Attest:
F. H. Schott
T. H. Libby
Inventor:
Charles W. White
by Wenner & Goldsborough
Attys

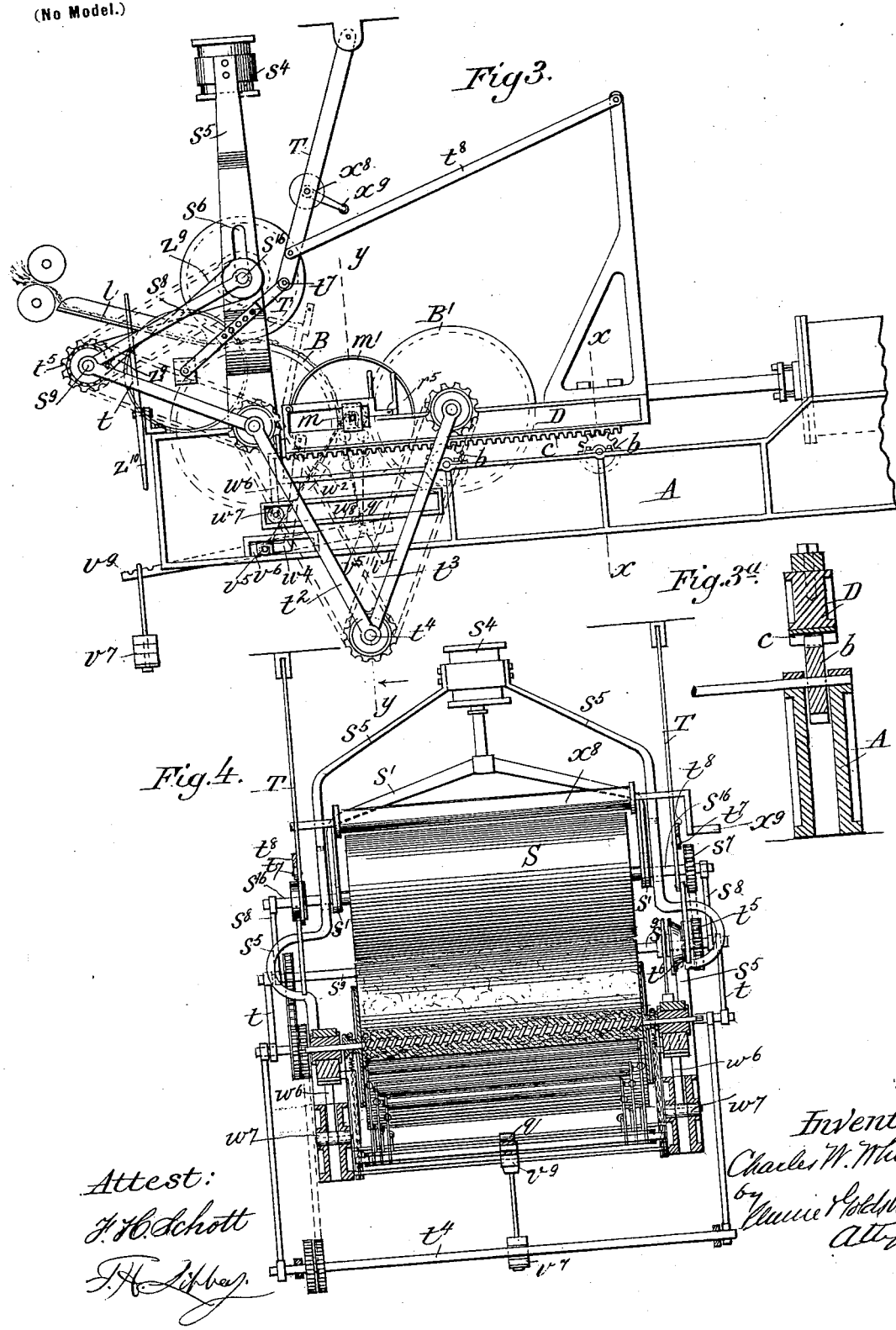

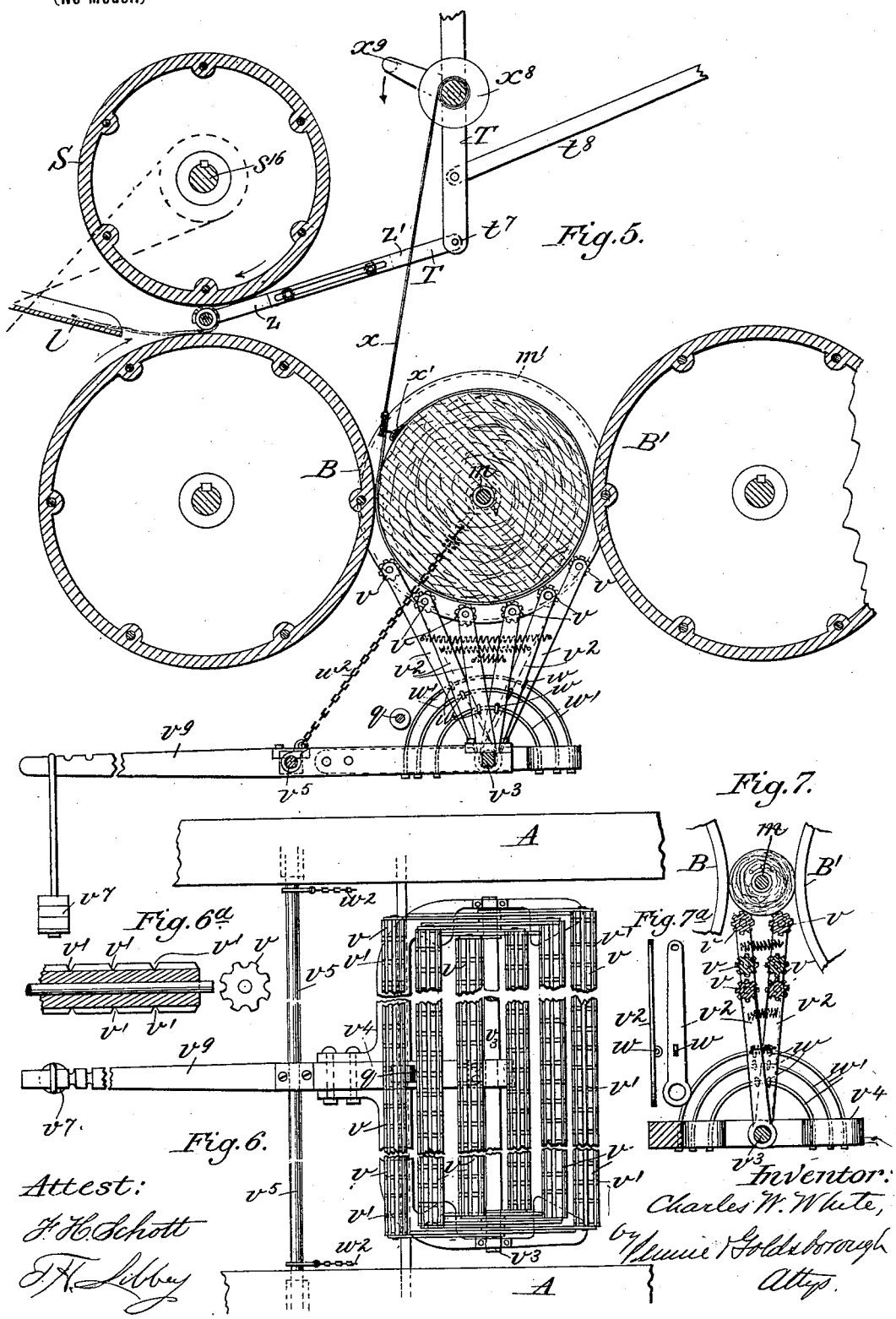

No. 631,915. Patented Aug. 29, 1899.
C. W. WHITE.
BALING PRESS.
(Application filed Apr. 24, 1895.)
(No Model.) 5 Sheets—Sheet 4.
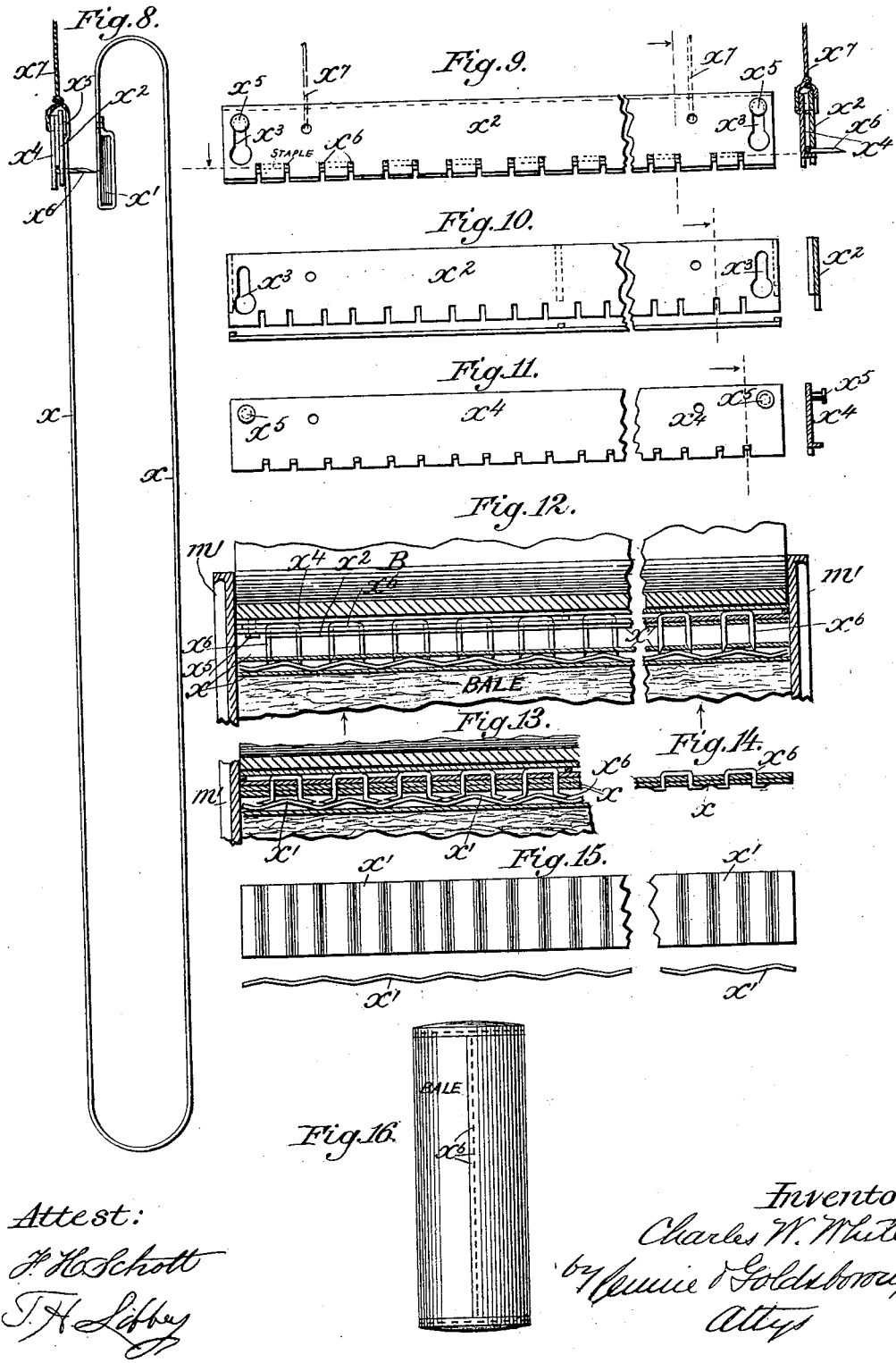

No. 631,915. Patented Aug. 29, 1899.
C. W. WHITE.
BALING PRESS.
(Application filed Apr. 24, 1895.)
(No Model.) 5 Sheets—Sheet 5.
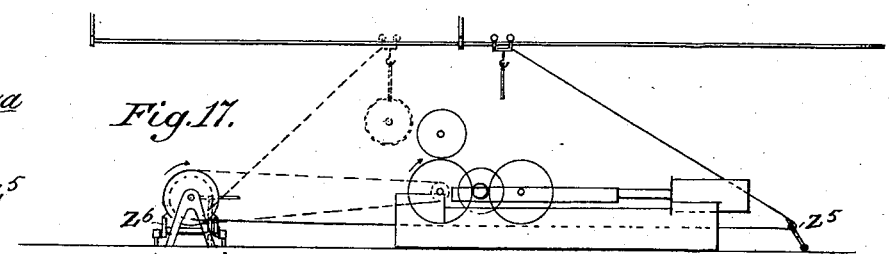
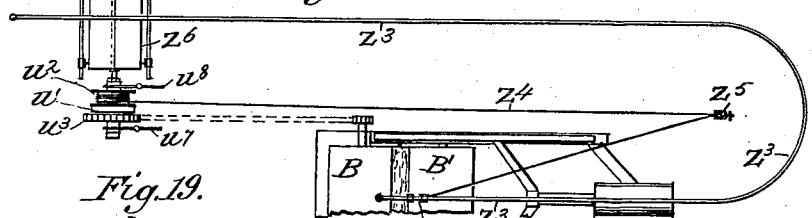
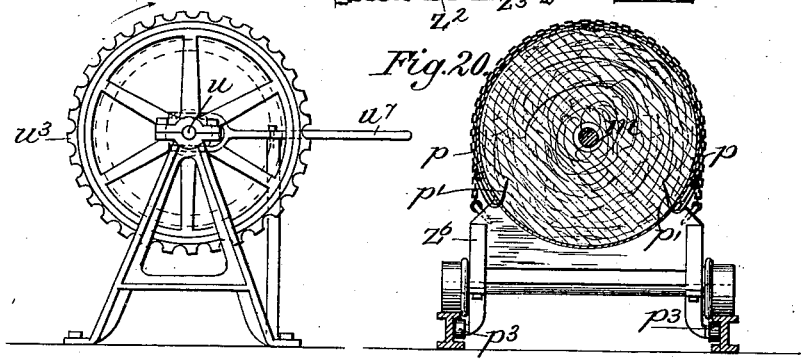
Attest:
F. H. Schott
F. H. Libbey
Inventor:
Charles W. White,
by Leunce & Goldsborough
Attys.

UNITED STATES PATENT OFFICE.

CHARLES W. WHITE, OF WACO, TEXAS, ASSIGNOR TO MARY J. WHITE, OF SAME PLACE.

BALING-PRESS.

SPECIFICATION forming part of Letters Patent No. 631,915, dated August 29, 1899.

Application filed April 24, 1895. Serial No. 547,018. (No model.)

*To all whom it may concern:*

Be it known that I, CHARLES W. WHITE, a citizen of the United States, residing at Waco, in the county of McLennan and State of Texas, have invented certain new and useful Improvements in Cotton Pressing and Baling; and I do hereby declare the following to be a full, clear, and exact description of the invention, such as will enable others skilled in the art to which it appertains to make and use the same.

My invention relates to certain new and useful improvements in cotton-presses, and is designed to realize the compressing and baling of the cotton in a continuous manner as it comes from the gin and without interrupting or decreasing the feed-supply.

In the accompanying drawings, Figure 1 represents in side elevation a cotton-press embodying my invention at the termination of a baling operation. Fig. 1$^a$ represents, partly in section and partly in elevation, the bale-core spindle in its relation to the headers of the formed bale. Fig. 2 represents a plan view, partly in section, of the cotton-press. Fig. 3 represents a side elevation of the cotton-press at the beginning of a baling operation. Fig. 3$^a$ represents an enlarged section on the line $x\ x$ of Fig. 3. Fig. 4 represents a section on the line $y\ y$ of Fig. 3. Fig. 5 represents, on a larger scale, a side elevation, partly in section, of the principal elements of the machine at the time of completion of the bale. Fig. 6 represents a plan view of the roller-guard bed and its appurtenances. Fig. 6$^a$ represents in detail the construction of one of the rolls thereof. Fig. 7 represents in sectional elevation some of the parts shown in Fig. 5 near the beginning of the baling operation. Fig. 7$^a$ represents in side and front elevation one of the guard-roller arms. Fig. 8 represents in side elevation the cover to be applied to the body of the bale immediately before it is removed from the machine and also the stapling device for the cover. Fig. 9 represents in front elevation and section one of the elements of the stapling device. Fig. 10 represents like views of one of the parts of said element. Fig. 11 represents like views of the other one of the parts of said element. Fig. 12 represents in section the operation of stapling the cover upon the body of the bale at the beginning of said operation. Fig. 13 represents a like view near the completion of the stapling operation. Fig. 14 represents in cross-section the completed staple-joint. Fig. 15 represents a plan and edge view of the second element of the stapling device. Fig. 16 represents a view of a covered bale having end covers in addition to the peripheral cover. Fig. 17 represents in side elevation my preferred apparatus for hoisting and conveying the finished bale to the car upon which it is to be held and also my preferred means for then extracting the core from the bale. Fig. 17$^a$ represents a detail of the hoisting and conveying devices. Fig. 18 represents a plan view of Fig. 17. Fig. 19 represents an end view of the core-extracting mechanism. Fig. 20 represents an end view of a bale mounted upon its car preparatory to the removal of the core; and Fig. 21 represents, partly in side elevation and partly in section, the parts shown in Figs. 19 and 20.

Similar letters of reference indicate similar parts throughout the several views.

Referring to the drawings, A indicates the frame of the press, which is adapted to be set up within a building, wherein it is securely and substantially housed.

B B' indicate the bale forming and compressing rollers relatively separable—as, for instance, by mounting the roller B in fixed bearings within a rigid frame A and by mounting the roller B' in bearings in a movable yoke or carriage D, which is provided on its under side with racks $c$, resting upon supporting cog-wheels $b$, so as to take the strain off the piston E of the steam or hydraulic cylinder F, to which piston the carriage is secured. The supporting cog-wheels $b$ are mounted to revolve freely in bearings in the frame and intermesh with the corresponding cogs of the racks $c$, thereby insuring the equal advance or recession of the racks, and consequently the uniform and equal movement of both ends of the carriage D. In order to adjust the carriage D to the piston, of which it forms, in reality, a continuation, I provide the connecting-spanner $e$ with a central perforated boss, through which it is adjustably connected by the locking-nuts $f$.

At the forward end of the carriage D are provided bearings, each adapted to be closed by an angle-plate $n'$, hinged at $n^2$, and adapted to be releasably held in place by the spring-catch $n^3$. These bearings are for the reception of sliding blocks $n^4$, within which are journaled to rotate freely the spindle of a core $m$. This core is provided with a spiral flange, as shown in Fig. 1$^a$, and at its extreme ends $m^2$ beyond the bearing-blocks is squared or otherwise formed for engagement with mechanism which will screw it out of the bale after the bale has been formed. Upon the core-spindle and inside its bearings are mounted loosely the circular sheet-metal disks $m'$, which form heads for the bale as it is being wound on the core.

The supply of cotton to the press may conveniently come directly from the gin and, passing down the chute $l$, will be received upon the roller B and drawn in between the roller B and a pressure-roller S, mounted to rotate within bearings formed in ends of a yoke $s'$, which is connected with the piston of a power-cylinder $s^4$, supported by the frame-arms $s^5$. These arms $s^5$ are slotted at $s^6$, so as to permit a limited rise of the roller S. The shaft $s^6$ of the roller S carries the fixed sprocket-wheel $s^7$ and the swinging arms $s^8$, which arms are mounted at their opposite ends upon a shaft $s^9$. The shaft $s^9$ has also mounted upon it the swinging arms $t$, supported from the shaft of the roller B. The arms $s^8$ and $t$ therefore constitute swinging bearings for the shaft $s^9$ and permit it to rise and fall with the rise and fall of the pressure-roller S. It will be noted that the distances between the axes of the roller B and the shaft $s^9$ and between the shaft $s^9$ and roller S remain at all times invariable. The shaft $s^9$ can therefore be driven from the roller B, and the roller S can be driven from the shaft $s^9$ by sprocket-gearing, as shown, or its equivalent. In like manner the roller B' is driven from the roller B by means of sprocket-gearing, the intermediate sprocket-gear shaft $t^4$ being mounted within and at the junction of the swinging arms $t^2 t^3$.

The sprocket gear-wheel $t^5$, from which the motion may be transmitted to the sprocket gear-wheel of the roller S, is mounted loosely on the shaft, so that normally the pressure-roller S runs by means of a cross-belt $z^9$ in the same direction as the roller B during the time that cotton is being supplied to the core between the rollers B B'; but a clutch $t^6$ is provided upon the shaft $s^9$ for locking the sprocket-wheel $t^5$ upon the shaft $s^9$ when occasion requires, so as to rotate the roller S in an opposite direction to the roller B, this being effected after the cross-belt $z^9$ has been shifted upon an idler by means of the shift-lever $z^{10}$.

Bars jointed at $t^7$ are suspended within bearings which permit them to swing. The long arm of each of these bars is connected by a link $t^8$ with a stanchion on the carriage D, and at its forward end the short arm is adapted to receive the spindle of a core of the same kind as that hereinbefore described, said core having a capacity to rotate freely, but capable of ready removal by springing the bars T apart. The short arms preferably are made in two parts $z z'$, having longitudinal slots, whereby they may be adjusted in length by means of bolts and nuts, as shown.

Immediately below the location of the main core is situated a series of rolls $v$, whose specific arrangement and construction are more fully shown on Sheet 3 of the drawings. They are fluted longitudinally and are provided with transverse peripheral grooves $v'$, thereby dividing their surfaces up into what might be called "corrugations." The rollers are mounted to revolve freely within the upper ends of arms $v^2$, adapted to turn upon a stationary rod $v^3$. The rod $v^3$ is supported by its squared ends within a frame or yoke $v^4$, fulcrumed upon a rod $v^5$, adapted to slide within bearings $v^6$ of the frame A. (See Figs. 1 and 3.) An adjustable counterweight $v^7$ is located at the end of the arm $v^9$ of the yoke and tends to raise the series of rolls. The rolls are arranged in pairs, the lowest pair being the shortest, the uppermost pair the longest, and the other pair intermediate in length. The arms of each pair are pushed toward each other by means of springs, and the arms themselves are provided with guiding-eyes $w$, through which pass the guide-arches $w'$. From the rod $v^5$ the chains $w^2$ extend and are adapted to engage with the shaft of the core by means of detachable hooks, so that as the core moves away from the roller B while the bale is forming the frame or yoke $v^4$ is moved correspondingly. The rod $v^5$ accordingly moves within its bearings $v^6$ and keeps constantly below the central axis of the core. The return of the frame or yoke $v^4$ with its appurtenant parts is effected by an arm $w^4$, depending from the carriage D, the movement of the carriage itself being limited by the stop-arms $w^6$, having rollers $w^7$, engaging within the guide-bearings $w^8$.

In Fig. 3 is shown the relation of the several parts of the apparatus at the beginning of a bale-forming operation. At such time the main-core spindle is in place within its sliding bearings and the auxiliary-core spindle of the same kind (with its headers) is in place within the bearings afforded by the free ends of the jointed bars. Motion is imparted to one of the compressing-rollers, as B, from a power belt-pulley T', and this motion is transmitted to the other compressing-roller B' by means of the sprocket-gearing. The cotton on reaching the bottom of the chute or incline $l$ passes between the roller B and the pressure-roller S, and is thereby flattened into the form of a sheet, which is conveyed down and wound continuously upon the main core, said core having, by reason of its location, a reverse rotation with respect to the roller B. The upper pair of rolls $v$ are rotated by the cotton upon the core $m'$, as indicated in Fig. 7, and as the bale increases in size it spreads said pair apart more and more, until the next lower pair, and finally the lowermost pair, comes into contact with the bale, as indicated in Fig. 5. The revolution of these rolls $v$ has the effect of catching any cotton that might tend to drop from the bale and press and spin it into the periphery of the bale and to do this symmetrically. As the cotton winds itself upon the core it is subjected to pressure between the rollers B B', the degree of such pressure being dependent upon the regulable tension of the fluid acting upon the piston of the cylinder F. The tension will be graduated to such an extent as to permit the continuation of the winding operation without interruption, while at the same time exerting the maximum pressure consistent therewith upon the bale as it is being formed. As the bale increases in diameter it causes the roller B' to recede correspondingly, this being permitted by the sliding bearings within which the core-spindle is mounted. This rearward movement of the roller B' and its carriage D against the tension of the cylinder F continues until sufficient cotton has been wound upon the core to constitute a complete bale, and the parts then occupy the positions indicated in Fig. 1. It will be observed that as the carriage has receded the auxiliary core has been gradually advanced from its original position of Fig. 3 toward the pass between the roller B and the pressure-roller S, and is finally drawn wholly within said pass just as the bale is completely wound upon the main core. The entry of the auxiliary core into the pass immediately cuts off the supply of cotton to the main core and enables the formed bale to be wound with a wrapping of fabric $x$, supplied to it in the manner indicated in Fig. 5. As shown more fully in this figure and on Sheet 4 of the drawings, the fabric $x$, of cotton ducking or the like, is intended to be connected to the bale by a stapling operation. For this purpose one of its edges to be joined is sewed to form a pocket open at its ends, and within this pocket is inserted the crimped clenching-plate $x'$, (shown in detail in Fig. 15,) said plate having a series of opposite inclines and being made of metal sufficiently rigid not to straighten out when subjected to the pressure it is designed to sustain. This plate $x'$ forms one of the parts of the stapling device. The other part of the stapling device is composed of two elements. (Shown, respectively, in Figs. 10 and 11.) One of these elements is a plate $x^2$, having at its lower edge a series of notches spaced apart distances equal to the width of the staples to be employed. It is also provided near its ends with elongated slots $x^3$, enlarged at one extremity. The second element consists of a plate $x^4$, having at its lower edge turned-up portions corresponding to the notches of plate $x^2$ and having locking-pins $x^5$. Consequently when the staples, as $x^6$, are placed within the notches of the plate $x^2$ and the two plates are assembled, as indicated in Fig. 9, the staples are securely held in place. This second part of the stapling device is connected by stout cords $x^7$, of wire or the like, to a drum $x^8$, whose shaft is journaled within the arms $t$ and which is provided with a crank-handle $x^9$.

In operation when the bale has been completely wound upon the core the end of the fabric containing the crimped part of the stapling device is inserted between the bale as it revolves and the roller B and is carried around the bale. The other part of the stapling device having been first attached to the opposite edge of the fabric, as indicated in Fig. 8, is kept under slight tension by the operator, who for that purpose keeps his hand on the crank-handle of the drum-shaft. When the fabric has completely enveloped the bale, its two edges to be joined overlap and in this overlapped condition are carried between the roller B and the bale. The beginning of this operation is indicated in Fig. 12, wherein under the compressing action of the roller B and the bale the staples are shown as passing through one wall of the pocket in which the crimped plate is contained. After passing through this wall the ends of the staples strike against the inclines of the crimped plate, and as the compressing action is continued the ends of the staples are bent outwardly and clenched, as indicated in Fig. 14, thereby firmly and securely uniting the lapping edges of the fabric and furnishing a complete covering for the periphery of the bale. End caps may after removal of the core be applied to the bale in any convenient manner if it is proposed to wholly incase it with the fabric, and the bale will then present the general appearance indicated in Fig. 16. While the formed bale is being covered the cotton is still being continuously supplied to the press by the chute, but instead of passing on to the main core is being wound upon the auxiliary core. When the periphery of the formed bale is fully covered with its wrapping of fabric, the carriage D is caused to recede by means of the cylinder F, thereby withdrawing the roller B' from the bale and releasing the bale from compression. The hinged plates $n$, covering the journals of the core, are then thrown back, as indicated in dotted lines in Fig. 1, and the bale may be lifted out by any suitable hoisting device—as, for instance, the block-and-tackle hoisting devices shown in Fig. 1—whereupon the lower block $z'$ is hooked below the inturned rim-flange of the header and the carriage $z^2$ is conveyed along the curved track $z^3$ by means of a hauling-rope $z^4$, which passes over a sheave $z^5$, as indicated in Figs. 17 and 18, and deposited upon a car $z^6$ upon a cross-track below. It will of course be understood that when in this construction the carriage conveying the bale has reached the central portion of the curved part of the track upon which it moves the sheave $z^5$ is disengaged from the hauling-rope, whereupon the drum takes up the slack and hauls the bale to the end of its track, as described.

In order to secure the bale to the car P, and thereby hold the bale rigidly while the core is being screwed out, I attach chains $p$ to staples on the car-frame and pass these chains about the bale. At the ends of the chains are the hooks $p'$, which are thereupon thrust into the bale, as indicated in Figs. 20 and 21, and securely lock it to the car. The car itself is prevented from tilting upon its trackway by providing it with rollers $p^3$, mounted in stout bearings depending from the car-frame, said rollers engaging beneath heads of the track-rails, as shown.

As indicated in Fig. 1$^a$, the core is composed of two separable sections $p^4 p^5$, screwed the one within the other, so that as the section $p^4$ is being screwed out of the bale it leaves the section $p^5$. This is of advantage, principally for the reason that in such event the squared end of the section $p^5$ is not drawn through the bale and consequently the cotton is not subjected to the cutting action of its angular edges. It will of course be understood that the metal disks $m'$ are removed from the core as soon as the bale is lifted out of its bearings and that the bale is not capped until the core has been removed.

The mechanism for screwing out the core is shown in detail in Figs. 19, 20, and 21. It consists of a shaft $u$, mounted to revolve freely in bearings and having secured upon it a clutch-disk $u'$, located midway between the winding-drum $u^2$ (which is loose upon the shaft) and the sprocket-wheel $u^3$, actuated by a sprocket-chain from a sprocket-wheel on the shaft of the roller B. The shaft $u$ is provided at its end with a coupling consisting of a part $u^4$, swiveled to swing horizontally, and a part $u^5$, swiveled to swing vertically. The part $u^5$ is forked at its outer end for the reception of the squared end of the section $p^4$ of the core and is adapted to be detachably locked thereto by the cotter-pin $u^6$. The sprocket-wheel $u^3$ and the winding-drum $u^2$ are each provided with a shifting-lever $u^7 u^8$. By shifting the said sprocket-wheel into frictional engagement with the clutch-disk $u'$, the shaft $u$ is caused to rotate and thereby to screw the core out of the bale, the car receding correspondingly. When the core has thus been extracted, the sprocket-wheel is shifted back to its original position and the shaft stops, whereupon the core is taken away by rewinding the other pin. To actuate the winding-drum, it (together with the sprocket-gear $u^3$) may be shifted into contact with the clutch-disk, as will be readily understood. After the core is removed the bale is ready for shipment or storage either with the addition of the end caps (shown in Fig. 16) or without them. The main core with its bale having been removed from the press, as described, the auxiliary core is designed to take its place, and this is effected by a further receding motion of the carriage D, which motion is continued until the auxiliary core has advanced to such a position that on straightening out the arms T the auxiliary core would be forced down into the place formerly occupied by the main core. During this movement of the auxiliary core it remains in contact with the roller B, and as the cotton is fed continuously said cotton continues to be wound on the auxiliary core. The straightening out in a vertical direction of the arms T takes place while the carriage is advancing again to its original position. During this descending movement of the auxiliary core it is held against the roller B by means of the spring-hooks $o$, connected with disks on the shaft of said roller and engaging the rim of the headers, as shown in Fig. 1. The advance of the carriage required for straightening out the arms T brings the roller B' back to the position shown in Fig. 3, and in this movement a projection $r^5$ on the hinged plates strikes against a portion of the frame, thereby closing said plates automatically upon the journal-bearing blocks, in which the core (which has now become the main core) is mounted. The arms T are sprung off sidewise from the new main core and the header-disks are already mounted in the said arms when they have been brought to their position shown in Fig. 2. All of the remaining parts resume the relative positions shown in Fig. 3 and the operation of forming the new bale proceeds as before.

It will be noted that the entire operation is a continuous one in the sense that the supply of cotton from the gin to the press is never interrupted and the output is correspondingly increased, the machine working constantly up to its full capacity.

The antifriction-roller $x$, mounted loosely on the rod $x'$, is for the purpose of limiting the upward throw of the frame $v^4$, in which the rolls $v$ are mounted, and to diminish friction during the forward and backward movements of the frame $v^4$ in its journals.

Having thus described my invention, what I claim is—

1. In a cotton-press, the combination with a roller, mounted in fixed bearings, a supply-pressure roller coöperating therewith, a third roller located beyond the first roller, a core between the two last-mentioned rollers, and an auxiliary core adapted to enter between the two first-mentioned rollers at the conclusion of the winding of the main core, thereby cutting off the supply to the main core without interrupting the feed to the press; substantially as described.

2. In a cotton-press, the combination with a roller mounted in fixed bearings, a supply-pressure roller coöperating therewith, a third roller located beyond the first roller, a core between the last two mentioned rollers, an auxiliary core adapted to enter between the two first-mentioned rollers at the conclusion of the winding of the main core, thereby cutting off the supply to the main core without interrupting the feed to the press, and means for automatically conducting the auxiliary core into the position originally occupied by the first; substantially as described.

3. In a cotton-press, the combination with the bale-forming rollers, and their core, of a pressure-roller located above the first bale-forming roller rotating therewith, an idler core insertible between the pressure-roller and the first bale-forming roller, and mechanism for positively rotating the pressure-roller in an opposite direction on the insertion of the auxiliary core; substantially as described.

4. In a cotton-press, the combination with the bale-forming rollers and their core, of a pressure-roller located above the first bale-forming roller and normally an idler, mechanism for imparting rotation to the said pressure-roller in the same direction that it would have as an idler, an auxiliary core insertible between the pressure-roller and the first bale-forming roller, mechanism for positively rotating the pressure-roller in an opposite direction on the insertion of the auxiliary core, and devices for throwing the first-named mechanism out of operation at such time; substantially as described.

5. In a cotton-press, the combination with the bale-forming rollers, and the core, of a carriage within which one of the rollers and the core are mounted, a power-cylinder operating the carriage, a swinging core-hanger, and an operating connection from the carriage to the core-hanger; substantially as described.

6. In a cotton-press, the combination with the bale-forming rollers, and intermediate core, of a pressure-roller located above the point of cotton-supply to the first bale-forming roller, a hanger, an auxiliary core mounted in the hanger and means for introducing said auxiliary core between the pressure-roller and the first bale-forming roller when a bale has been formed on the main core; substantially as described.

7. In a cotton-press, the combination with the bale-forming rollers and intermediate core, of a pressure-roller located above the point of cotton-supply to the first bale-forming roller, a hanger, an auxiliary core mounted in the hanger and means for introducing said auxiliary core between the pressure-roller and the first bale-forming roller when a bale has been formed on the main core, and for subsequently forcing said auxiliary core into the position vacated by the main core; substantially as described.

8. In a cotton-press, the combination with the bale-forming rollers, and core, of a jointed swinging hanger for the core, said hanger having its point of suspension above and between the rollers, and means for straightening out the joint so as to force the core into place between the rollers; substantially as described.

9. In a cotton-press, the combination with the bale-forming rollers, and intermediate core, of a carriage in which the core and one of the rollers are mounted, slide-blocks within which the core is journaled, hinged plates forming the upper bearings for the slide-blocks, and releasable catches for the hinged plates; substantially as described.

10. In a cotton-press, the combination with the bale-forming rollers, and intermediate core, of a carriage within which the core and one of the rollers are mounted, slide-blocks within which the core is journaled, hinged plates forming the upper bearings for the slide-blocks, releasable catches for the hinged plates, and means for automatically closing the hinged plates when the carriage is advanced; substantially as described.

11. In a cotton-press, the combination with the bale-forming rollers and the pressure-roller, the first bale-forming roller being mounted in stationary bearings and the other two rollers being mounted in movable bearings, of transmitting-gearing from the stationary roller to the movable rollers, said transmitting-gearing being carried by swinging arms radial respectively to the rollers; substantially as described.

12. In a cotton-press, the combination with the bale-forming rollers, of an intermediate core, and rolls located beneath the core, swinging arms within which the rollers are mounted, and springs tending to draw the arms together; substantially as described.

13. In a cotton-press, the combination with the bale-forming rollers, of an intermediate core, sliding bearings for the core, a series of rolls beneath the core, and a movable frame within which the rollers are mounted; substantially as described.

14. In a cotton-press, the combination with the bale-forming rollers, of an intermediate core, sliding bearings for the core, a series of rolls beneath the core, a movable frame within which the rollers are mounted, a supporting-rod upon which the frame is fulcrumed, and a counterweight for the frame; substantially as described.

15. In a cotton-press, the combination with the bale-forming rollers, of an intermediate core, sliding bearings for the core, a series of rolls beneath the core, a movable frame within which the rolls are mounted, a supporting-rod upon which the frame is fulcrumed, a counterweight for the frame, and connections between the supporting-rod and the movable core; substantially as described.

16. In a cotton-press, a roller-guard bed for the core, consisting of pairs of rolls, arranged one above the other, the upper pair being the longest and the lower pairs being successively shorter, springs tending to draw the rolls of each pair toward each other, and arms within which the rolls are mounted, said arms being adapted to swing upon a common center of support; substantially as described.

17. In a cotton-press, a roller-guard bed for the core, having rolls provided with longitudinal grooves intersected by transverse grooves; substantially as described.

18. In a cotton-press, the combination with the bale-forming rollers, the pressure-roller, the auxiliary core and its headers, means for withdrawing the auxiliary core from between the first bale-forming roller and the pressure-roller and spring-hooks engaging with the headers and connected with disks mounted loosely on the shaft of the first bale-forming roller; substantially as described.

19. In a cotton-press, the combination with the auxiliary core, of a hanger therefor, said hanger consisting of jointed arms, one of which is adjustable in length; substantially as described.

20. In a cotton-press, a drum adapted to supply a cover or wrapper to the bale, means for applying tension to the drum, and stapling devices to unite the edges of the cover or wrapper; substantially as described.

21. In a baling-press, the combination with the rolls arranged to provide a compressing-pass between them, of means for delivering a cover or wrapper to the bale, and means substantially as described for securing the overlapping edges of the cover together by staples, and fastening said staples by passing the connected edges of the cover through the compression-pass of the press.

22. A bale cover or wrapper consisting of a piece of fabric having a pocket along one of its edges, a staple-clenching plate insertible within said pocket, a staple-holder adapted to be connected with the opposite edge of the fabric by means of the staples themselves and a tension-drum connected to the staple-holder; substantially as described.

23. A bale cover or wrapper consisting of a piece of fabric having a pocket along one of its edges, a staple-clenching plate insertible within said pocket, a staple-holder adapted to be connected with the opposite edge of the fabric by means of the staples themselves, and a tension-drum connected to the staple-holder; the clenching-plate and the staple-holder being removable at the end of the stapling operation; substantially as described.

24. A staple-holder consisting of a plate notched at its lower edges for the reception of the staple, and a second plate having projections for supporting the staples within said notches, said plates being adapted to be assembled or disassembled by means of interlocking parts; substantially as described.

25. The combination with a car for the reception of a cotton-bale, of means for securing the bale to the car, means for unscrewing a screw-core from the bale, a trackway upon which the car is adapted to run, and arms projecting from the frame of the car beneath the head of the track and provided with friction-rollers; substantially as described.

26. The combination with a cotton-press of a combined core-extracting, bale-hoisting and bale-conveying device, the same consisting of a shaft having a clutch-disk fixed thereon and provided with connections for attachment to the screw-core, a winding-drum loose upon said shaft, a sprocket-wheel loose upon the shaft, shifting levers on the sprocket-wheel and winding-drum, a traveling rope upon the winding-drum, a hoisting-carriage to which the rope is attached, a car provided with means for locking a cotton-bale thereon, and a trackway for the traveling carriage leading from the press to said car; substantially as described.

27. In a cotton-press, a roller-guard bed for the core, consisting of pairs of rolls, arranged one above the other, the upper pair being the longest and the lower pairs being successively shorter, springs tending to draw the rolls of each pair toward each other, and arms within which the rolls are mounted, said arms being adapted to swing upon a common center of support and guides for the arms during their movement; substantially as described.

28. In a cotton-press, the combination with the bale-forming rollers, of an intermediate core, a carriage having sliding bearings for the core, a series of rolls beneath the core, a movable frame within which the rolls are mounted, a supporting-rod upon which the frame is fulcrumed, a counterweight for the frame, connections between the supporting-rod and movable core and a projection from the carriage for returning the frame to its original position; substantially as described.

29. In a cotton-press, the combination with the bale-forming rollers, of an intermediate core, sliding bearings for the core, a series of rolls beneath the core, a movable frame within which the rolls are mounted, a supporting-rod upon which the frame is fulcrumed, a counterweight for the frame, connections between the supporting-rod and the movable core, and an antifriction-roller for limiting the upward movement of the frame and diminishing friction during the forward and backward movements of the frame; substantially as described.

30. In a cotton-press, the combination with the bale-forming rollers and intermediate core, of a carriage within which the core is mounted, and a projection from the carriage engaging within a guideway of the cotton-press frame to prevent the carriage overriding the first bale-forming roller; substantially as described.

31. In a cotton-press, the combination with the bale-forming rollers and intermediate core, of a carriage within which the core is mounted, and cog-and-rack connections between the opposite sides of the carriage and the cotton-press frame, so that both sides of the carriage may be compelled to advance in exact uniformity; substantially as described.

32. A staple-holder consisting of a plate notched at its lower edges for the reception of the staple, and a section-plate having projections for supporting the staple within said notches, said plates being adapted to be assembled or disassembled by means of interlocking parts; and spacing projections between said plates; substantially as described.

33. In a cotton-press, the combination with the bale-forming rollers, and bale-elevating devices, of an intermediate core, and headers mounted loosely on the core, said headers being provided with bent rim-flanges to be engaged by the bale-elevating devices; substantially as described.

In testimony whereof I affix my signature in presence of two witnesses.

CHARLES W. WHITE.

Witnesses:
 T. H. LIBBEY,
 HARRY Y. DAVIS.